(12) United States Patent
Yahagi

(10) Patent No.: US 6,783,246 B2
(45) Date of Patent: Aug. 31, 2004

(54) GHOST IMAGE PREVENTION ELEMENT FOR IMAGING OPTICAL SYSTEM

(75) Inventor: Satoshi Yahagi, Fuchu (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/245,681

(22) Filed: Sep. 18, 2002

(65) Prior Publication Data

US 2003/0058414 A1 Mar. 27, 2003

(30) Foreign Application Priority Data

Sep. 26, 2001 (JP) ..................................... 2001-294142

(51) Int. Cl.[7] ............................................ G03B 21/14
(52) U.S. Cl. ........................................ 353/69; 353/122
(58) Field of Search .......................... 353/69, 100, 121, 353/122

(56) References Cited

U.S. PATENT DOCUMENTS

| 2,178,245 | A |   | 10/1939 | Schwarz |        |
|-----------|---|---|---------|---------|--------|
| 4,981,352 | A |   | 1/1991  | Tejima et al. | |
| 6,447,122 | B1| * | 9/2002  | Kobayashi et al. | 353/97 |
| 6,522,453 | B2| * | 2/2003  | Yoneyama | 359/290 |
| 6,557,999 | B1| * | 5/2003  | Shimizu | 353/20 |
| 2002/0105622 | A1 | * | 8/2002 | Wang | 353/69 |
| 2003/0086624 | A1 | * | 5/2003 | Garcia | 382/275 |

FOREIGN PATENT DOCUMENTS

| JP | 2000-036917 | 2/2000 |
| JP | 2000-249820 | 9/2000 |

* cited by examiner

Primary Examiner—William Dowling
(74) Attorney, Agent, or Firm—Arnold International; Jon W. Henry; Bruce Y. Arnold

(57) ABSTRACT

An imaging optical system includes at least one ghost image prevention element. Ghost images are prevented even when the imaging optical system includes an optical element that has at least one planar surface that is generally orthogonal to an optical axis of the imaging optical system, and is located in a light flux area with at least a central portion of the light flux area being generally parallel to the optical axis. The ghost image prevention element is especially useful in video cameras and digital cameras that use an image sensor having a planar surface that exhibits a high coefficient of reflection. The ghost image prevention element includes one planar surface, that is "tightly bound" to the planar surface of the optical element, and another surface that is curved so as to satisfy a given condition. The curved surface diffuses light that would otherwise contribute to a ghost image.

20 Claims, 6 Drawing Sheets

GHOST IMAGE PREVENTION ELEMENT FOR IMAGING OPTICAL SYSTEM

BACKGROUND OF THE INVENTION

In imaging optical systems, parallel light flux areas are often arranged within the imaging optical system for various purposes. For example, in some imaging optical systems a parallel light flux area is provided at a position where an a focal optical system is to be inserted in order to change the focal distance of the imaging optical system. As another example, a parallel light flux area may be arranged within an imaging optical system in order that a beamsplitter, such as a beamsplitting prism, may be positioned in the parallel light flux area in order to introduce light to a finder system or to an optical ranging system for an auto focus system. A parallel light flux area is also useful for placing other optical elements. One such example is an interference filter wherein the transmittance of the filter is sensitive to the angle of the incident light.

Optical elements, including prisms and filters, that are to be inserted in parallel light flux areas generally have one or more planar surfaces that are substantially orthogonal to the optical axis and are for transmitting light. The use of parallel light flux areas with such an optical element, herein termed a "planar element" for purposes of clarity of description, causes a problem of ghost images. These ghost images are created by light that is transmitted by the planar element but is then reflected back to the planar element by optical elements or image detecting surfaces that receive the transmitted light. The light reflected back to the planar element may, in turn, be reflected by the planar element back through the optical elements to an image surface that also receives the originally transmitted light, thereby creating a ghost image. Additionally, light reflected by the planar element may be again reflected by optical elements or image sensor surfaces that follow the planar element, thereby creating additional ghost images. Especially when using a CCD image sensor, which has an image surface with a higher coefficient of reflection than that of film, substantial amounts of light may be reflected in the optical system, and this will degrade the quality of the final image.

FIG. 5 is a side view of a prior art optical system that will be used to explain the occurrence of ghost images. The imaging optical system of FIG. 5 includes lenses $L_1$, $L_2$, and $L_3$, and a collimated light flux from the object side that is parallel to the optical axis X will be focused by the lens $L_3$ to the position P on the image surface 1. In the parallel light flux area C between lens $L_2$ and lens $L_3$, a beamsplitter 2 is arranged as a planar element and the light flux is split by the beamsplitter 2 into a first image surface side light beam and a second image surface side light beam.

Ghost images are generated by light that is reflected by image surface 1 and then reflected by a planar surface 3 that is generally orthogonal to the optical axis in the parallel light flux area C back to the image surface 1. As shown in FIG. 5, the primary light beam going in the direction $1_1$ strikes the image surface 1. A portion of the incident light is reflected in the direction $1_2$ and is refracted by lens $L_3$ in the direction $1_3$. Then a portion of that light is reflected on the planar surface 3 back along the same route, as shown by the direction arrows $1_4$ and $1_5$. A portion of the light that is reflected by the image surface 1 may also be transmitted by the planar surface 3 and reflected by the planar surface 4 in the direction $1_4$ so as to reach the image surface 1 again.

FIGS. 6(a) and 6(b) show the appearance of ghost images on the image surface 1 of the optical system of FIG. 5 for on-axis and off-axis image points, respectively, with reference to a horizontal axis H and vertical axis V when enough light to produce ghost images is present in the optical system. As shown in FIG. 6(a), the primary image Pc of the object is imaged in the central position of the image surface 1 and the ghost image Gc appears in the neighborhood of the center of the image detecting surface with a similar shape to that of the primary image. As shown in FIG. 6(b), when the primary image Pd is off-axis, that is, away from the center of the image surface 1, the ghost image Gd appears in a position that is symmetrical to the image Pd of the object with respect to the center point of the image detecting surface, and with a shape similar to the primary image.

The ghost image Gd of every off-axis image point is displaced from its proper primary image Pd on image surface 1. Because the various planar surfaces that are orthogonal to the optical axis reflect substantial amounts of light and that light is reflected back and forth through the optical system, the ghost images may be visible when one or more planar surfaces orthogonal to the optical axis are present in the parallel light flux area C. Thus, this light will reduce the quality of the final image unless measures are taken to reduce the amount of reflected light or prevent reflected light from reaching the image surface.

Adding an anti-reflection coating on the planar element is a known way of reducing the amount of light in the ghost images. Japanese Laid Open Application No. 2000-036917 discloses a method of reducing unwanted reflected light by applying an anti-reflection coating on a planar surface of a filter. However, because about 0.1–0.2% of the reflected light remains by this method, a substantial amount of unwanted reflected light is still imaged from bright light sources, such as the light from car headlights or from the sun, creating ghost images that are considered unacceptable for high performance video cameras and digital cameras. As a result, in an imaging optical system that requires a high performance in the prevention of ghost images, it has been considered desirable to avoid placing an optical element having a planar surface generally orthogonal to the optical axis in a light flux area where at least the central portion of the light flux area is generally parallel to the optical axis.

As another method of ghost image prevention, it is known to make the surfaces of optical elements that are generally orthogonal to the optical axis some shape other than planar. For example, Japanese Laid Open Application No. 2000-249820 discloses making a plate filter unit in a bent shape with curved surfaces. However, it is difficult and costly to fabricate this kind of filter.

BRIEF SUMMARY OF THE INVENTION

The object of the present invention is to provide an imaging optical system having a simple and inexpensive construction that prevents ghost images, even in the case where the imaging optical system includes an optical element that has one or more planar surfaces that are generally orthogonal to the optical axis of the imaging optical system and which are located in a light flux area before the image surface, with at least the central portion of the light flux area having light rays that are generally parallel to the optical axis. The present invention is especially useful in imaging optical systems, such as video cameras and digital cameras, that use an image sensor having a planar image surface with a high coefficient of reflection.

BRIEF DESCRIPTION OF THE DRAWINGS

The present invention will become more fully understood from the detailed description given below and the accompanying drawings, which are given by way of illustration only and thus are not limitative of the present invention, wherein.

Figure 1:
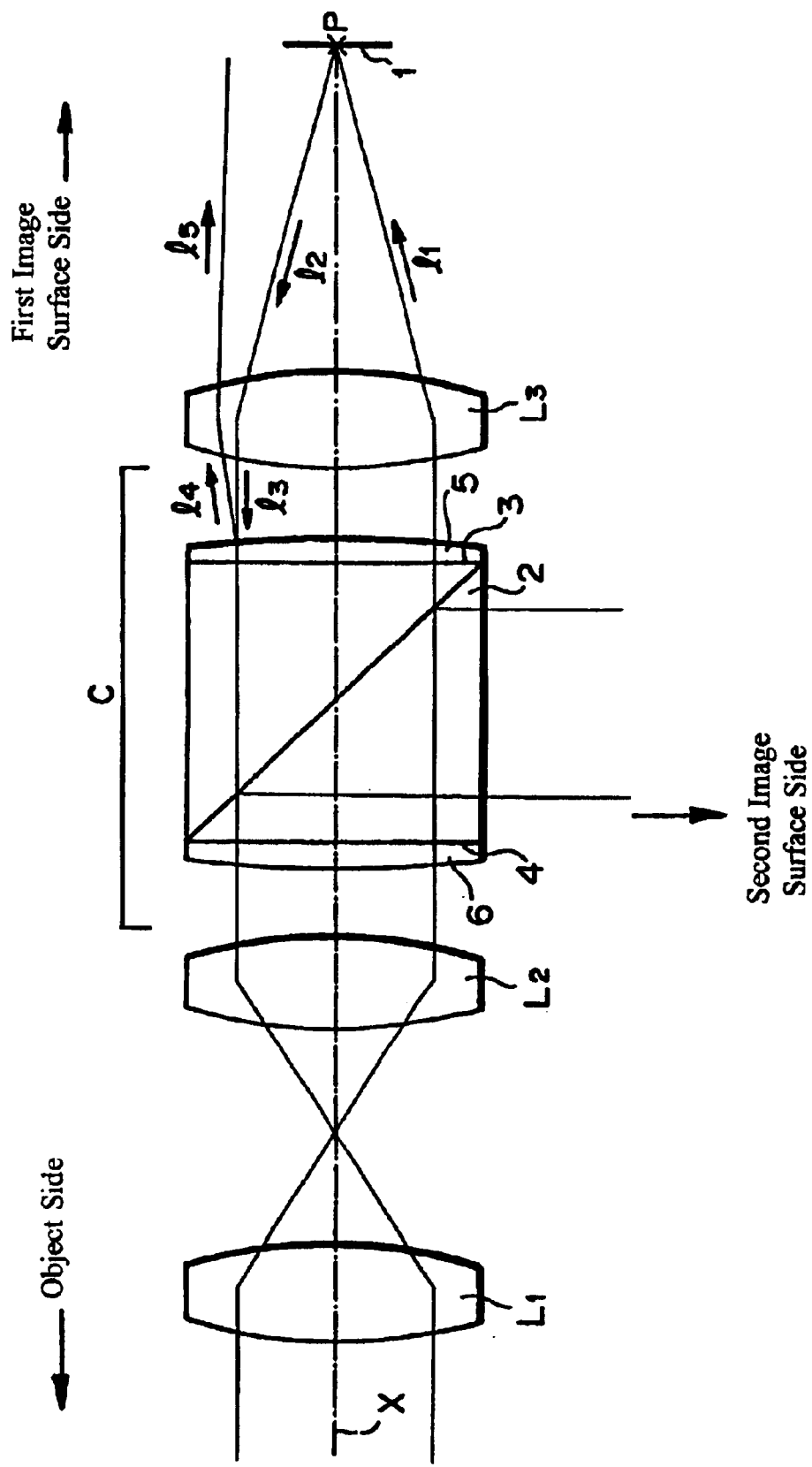
FIG. 1 is a side view of an imaging optical system according to Embodiment 1 of the present invention.
Figure 3:
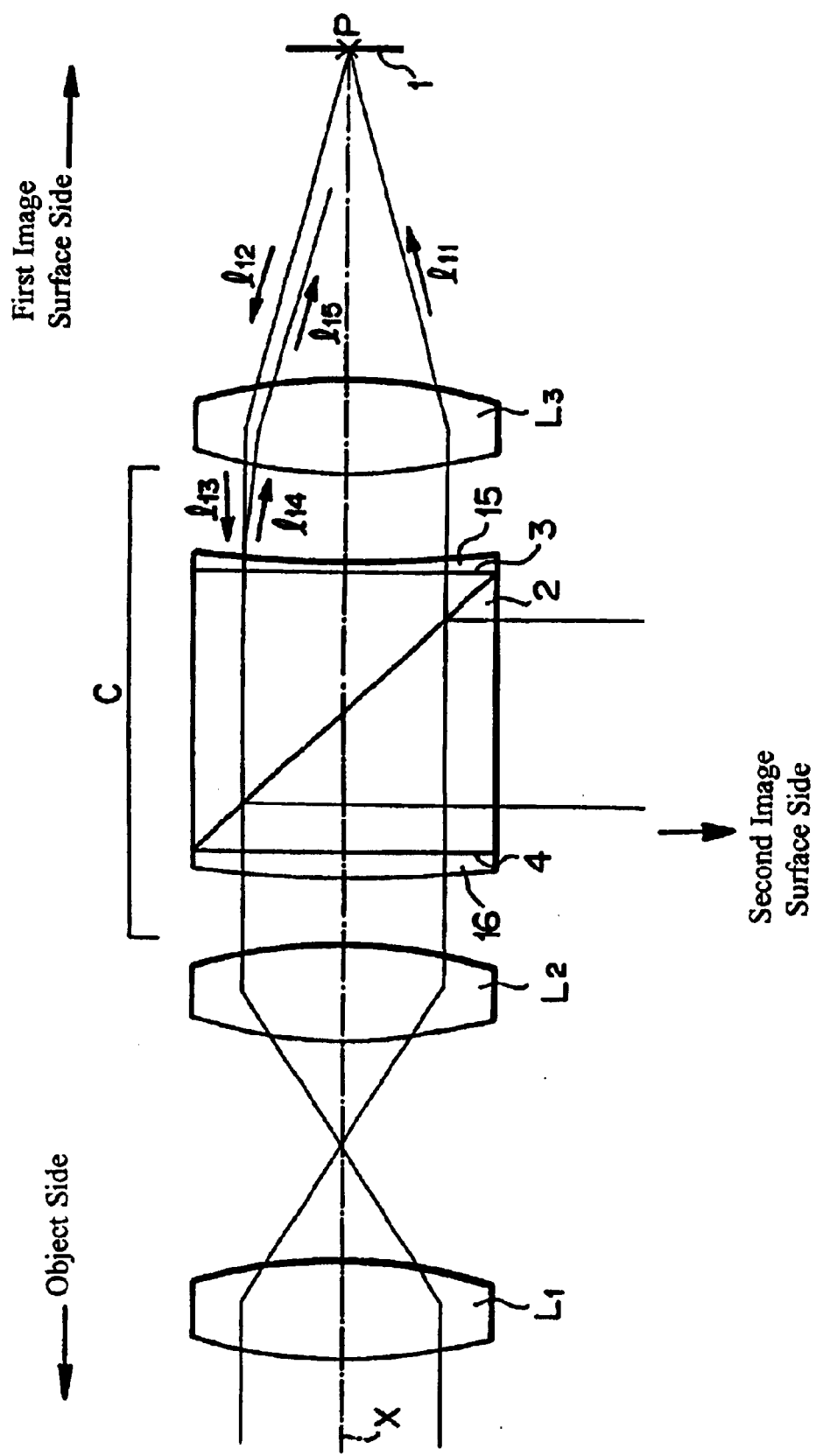
FIG. 3 is a side view of the imaging optical system of Embodiment 2 of the present invention.
Figure 4:
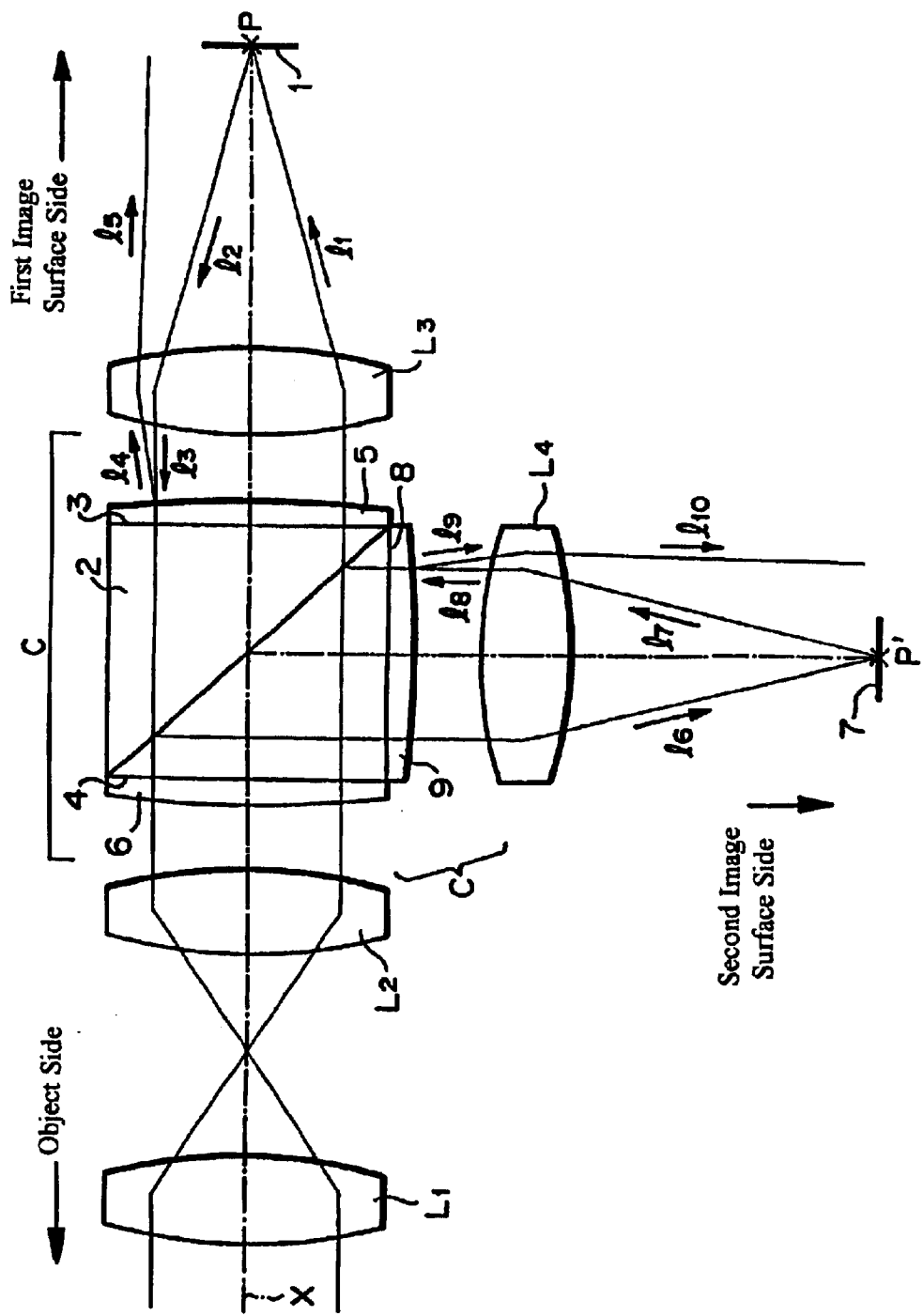
FIG. 4 is a side view of the imaging optical system of Embodiment 3 of the present invention.
Figure 5:
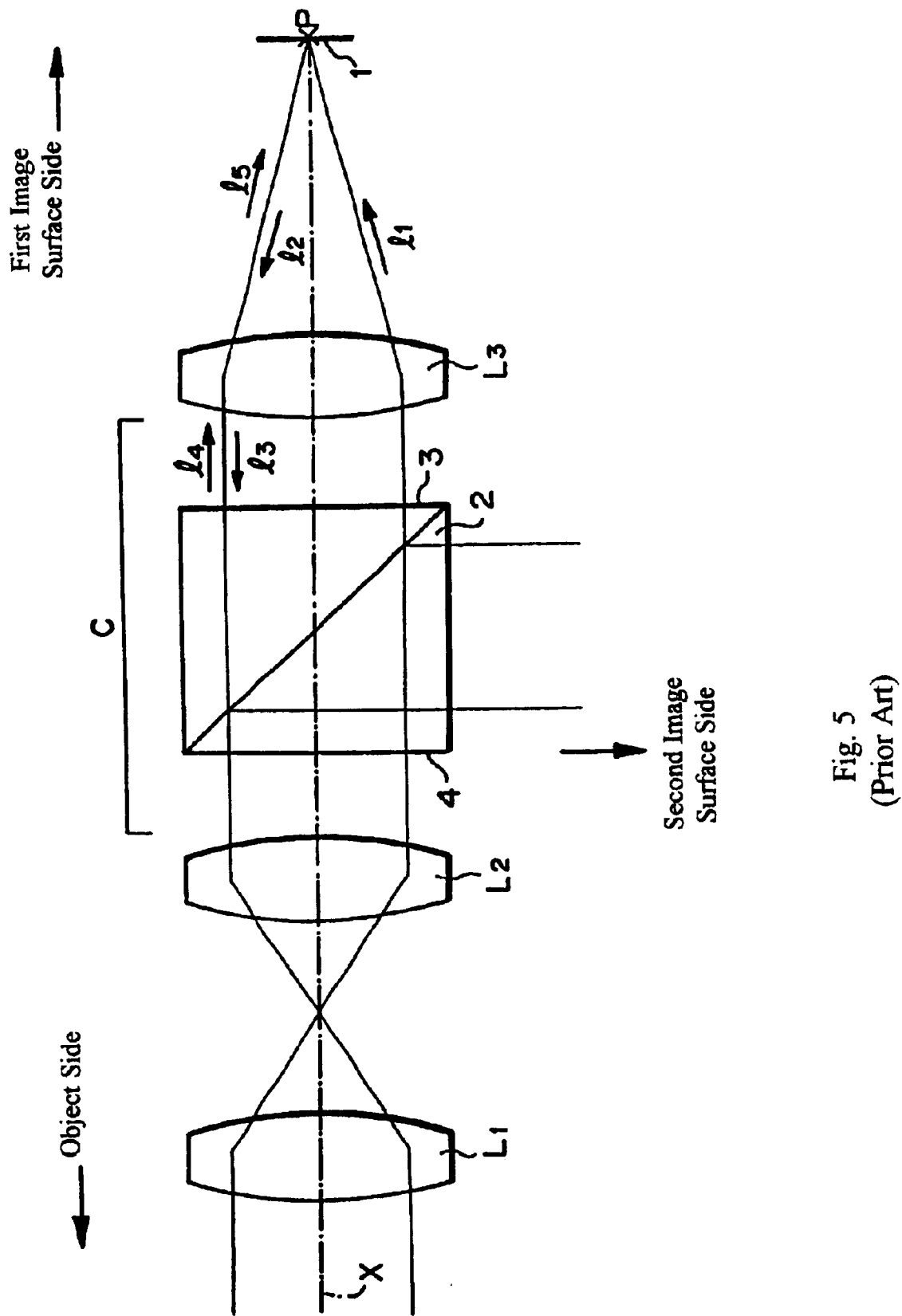
FIG. 5 is a side view of a prior art imaging optical system.
Figure 6B:
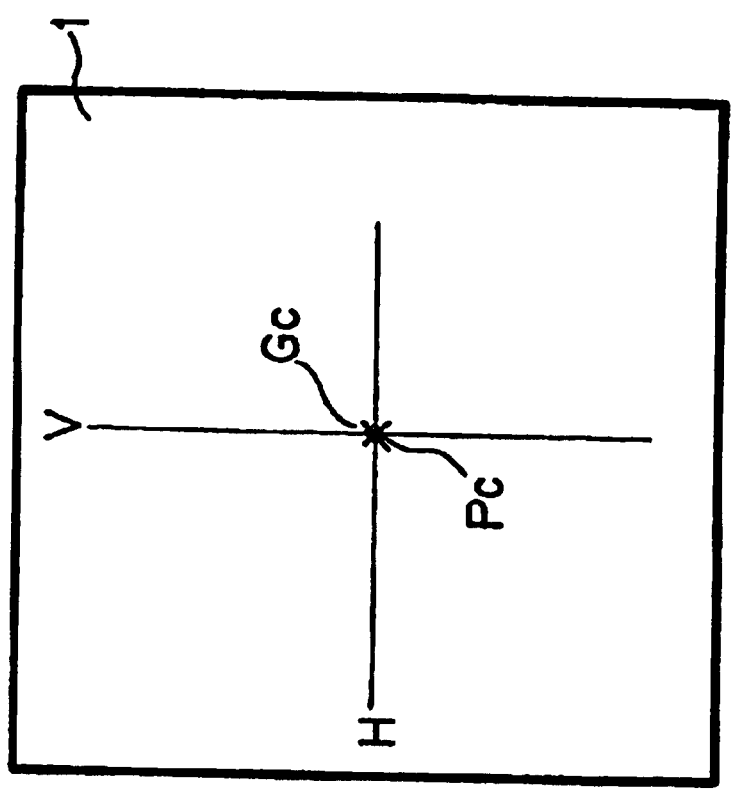
FIGS. 6(a) and 6(b) show primary images and ghost images for on-axis and off-axis primary images, respectively, in the prior art imaging optical system of FIG. 5.
Figure 6A:
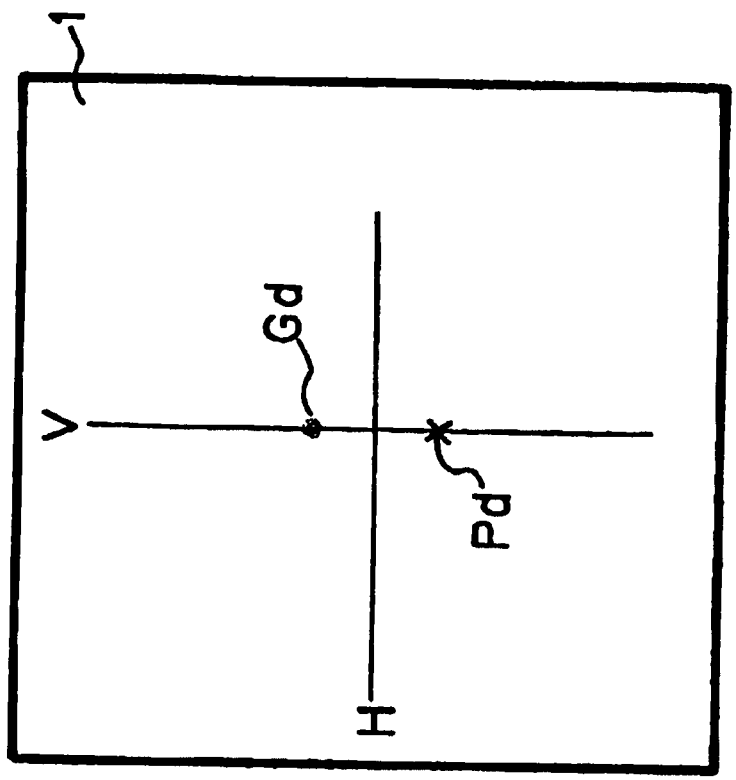

Although the refraction of light rays occurs entirely at the surfaces of lens elements, for convenience of illustration the refraction of light rays is illustrated instead in FIG. 1 and in FIGS. 3–5 as occurring once within each lens element.

DETAILED DESCRIPTION

In the present invention, a ghost image prevention element is made, for example, of glass and has an index of refraction that is substantially equal to that of an optical element, which will be referred to herein as a "planar element" for purposes of clarity. The planar element may be a beamsplitter, for example. The planar element includes a planar surface that is tightly bound to a planar surface of the ghost image prevention element, so as to form an integral unit. The planar surface is generally orthogonal to the optical axis. The term "tightly bound" means that no air layer is between the planar element and the ghost image prevention element, the elements being pressed together from one or both sides, being bonded by a thin adhesive layer, or being formed as a one-piece structure so that no clear boundary exists between the planar element and the ghost image prevention element. The other surface of the ghost image prevention element is a curved surface. The integral unit as described above is positioned in the light flux area with at least the central portion of the light flux area being generally parallel to the optical axis of the imaging optical system.

The curved surface of the ghost image prevention element should be a lens surface with a large radius of curvature that satisfies the following Condition (1):

$$7 < |R|/f_{mr} < 20 \qquad \text{Condition (1)}$$

where $f_{mr}$ is the combined focal length of any lenses located between the ghost image prevention element and the image surface, and R is the radius of curvature of the lens surface of the ghost image prevention element.

A ghost image prevention element should be tightly bound with each planar surface of each planar element in the optical system. Where multiple planar surfaces are positioned in one or more parallel light flux areas, the curved surface of each ghost image prevention element (one for each planar surface) should satisfy the above Condition (1).

The index of refraction of the material of the ghost image prevention element is generally given by the following Condition (2):

$$1.5 < n_d < 1.6 \qquad \text{Condition (2)}$$

where $n_d$ is the index of refraction of the material of the ghost image prevention element at the wavelength of the sodium d-line.

The ghost image prevention element should be optically equivalent to a respective planar element at wavelengths of interest. The term "optically equivalent" is defined herein to mean that the indexes of refraction and other refractive characteristics, such as the Abbe number, as appropriate, are substantially the same.

As mentioned above, a ghost image prevention element should be tightly bound to each planar surface of any planar elements in the optical system. For example, when the planar element is a beamsplitter prism, or more particularly a beamsplitter cube, a ghost image prevention element should be tightly bound to each light receiving planar surface and the plural light output planar surfaces of the beamsplitter cube. When the curved surfaces of ghost image prevention elements are arranged in series, one curved surface may be convex and the other curved surface may be concave in order for the optical powers of the ghost image prevention elements to at least partially cancel each other. If the radii of curvature of the convex and concave ghost image prevention elements in series are the same magnitude and of opposite sign, the ghost image prevention elements are optically equivalent to a planar element. In such a case, the ghost image prevention elements may have little optical effect other than to prevent ghost images.

The present invention will first be described in general terms with reference to FIG. 1 of the invention which, though depicting a particular embodiment, is also fairly well representative of the overall invention.

The imaging optical system of FIG. 1 includes lenses $L_1$–$L_3$ that focus on-axis, collimated input light to the image position P on the image surface 1. Beamsplitter 2 is arranged in the parallel light flux area C where the central light flux is substantially parallel to the optical axis X and, more particularly, is arranged between lenses $L_2$ and $L_3$. The beamsplitter 2 splits the input light flux into two parts, with one part being directed toward a first image surface side and the other part being directed toward a second image surface side. Beamsplitter 2 is the planar element with both the surface 4 on the object side and the surface 3 on the first image surface side being planar surfaces. As shown in FIG. 1, ghost image prevention elements 5 and 6 are "tightly bound" to surfaces 3 and 4, respectively. Preferably, the same glass material is used for the ghost image prevention elements 5, 6 and the beamsplitter 2.

The effect of a ghost image prevention element will be explained with reference to ghost image prevention element 5. As shown in FIG. 1, part of the light of the light beam traveling in the direction of light ray $1_1$ is reflected from image surface 1 in the direction of light ray $1_2$ and refracted by lens $L_3$ in the direction of light ray $1_3$. A portion of the refracted light is reflected at the convex lens surface of ghost image prevention element 5 as shown by direction arrows $1_4$, $1_5$. Unlike the imaging optical system of prior art FIG. 5, light traveling in the direction of light ray $1_3$ is not reflected directly back in the opposite direction by planar surface 3 on the first image surface side of the planar element. Rather, as shown in FIG. 1, the refracted light is reflected in the direction of light rays $1_4$ and $1_5$ so that a sharp ghost image will not be formed on the image surface 1.

Figure 2B:
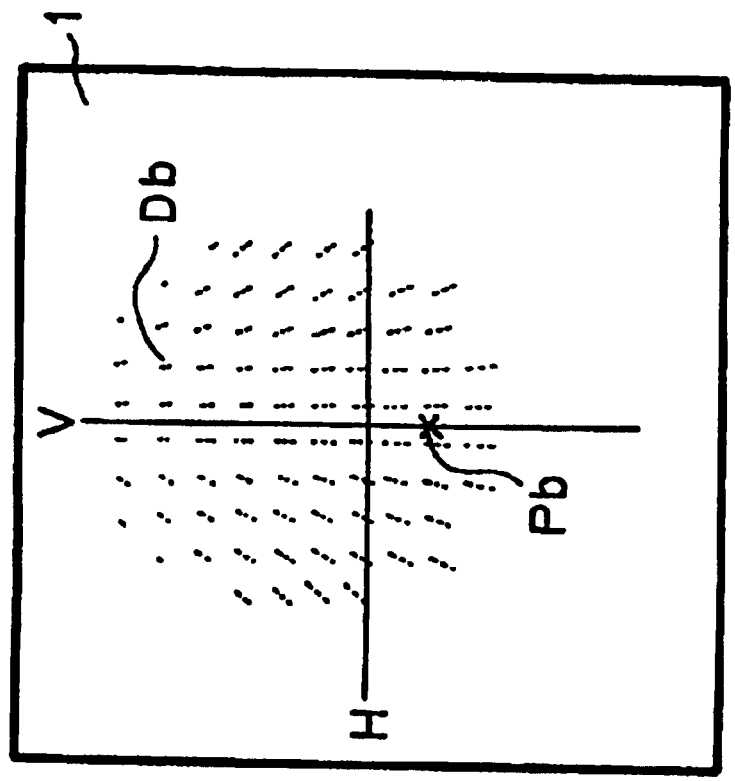
FIGS. 2(a) and 2(b) show primary images and diffused images for on-axis and off-axis primary images, respectively, in the imaging optical system of Embodiment 1.
Figure 2A:
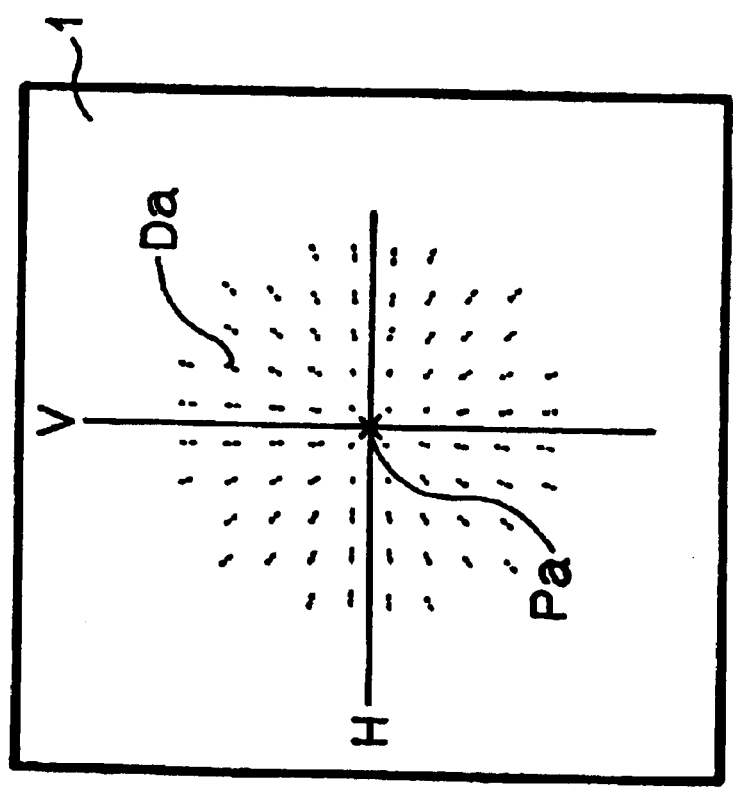

FIGS. 2(a) and 2(b) show the appearance of images and light patterns on the image surface 1 of the optical system of FIG. 1 for on-axis and off-axis image points, respectively, with reference to a centered horizontal axis H and a vertical axis V when enough light to produce a potential ghost image problem is incident onto the optical system of FIG. 1. As shown in FIG. 2(a), the primary image Pa of the object is imaged in the central position of the image surface 1. However, light that is reflected from the image surface 1 but then is reflected back to the image surface 1 by the convex surface of the ghost image prevention element 5 is diffused symmetrically around the primary image Pa into a diffuse light image Da. This occurs because the light that is reflected by the convex surface of the ghost image prevention element 5 does not follow the same route as the primary light beam that is directly reflected from the image surface 1. As shown in FIG. 2(b), for an off-axis primary image point Pb, the ghost image prevention element 5 similarly results in diffused image light Db being incident onto the image surface 1. Diffused image light Db is centered at a point on the image surface that is on the opposite side of the optical axis from the primary image Pb and is roughly equidistant from the optical axis. Therefore, no well-defined ghost images are produced in the imaging optical system, even when the objects being imaged are very bright.

To minimize internal reflections at the interface of the ghost image prevention element 5 and the planar surface 3, optically equivalent materials, as defined above, are used for the ghost image prevention element 5 and the beamsplitter 2. As shown in FIG. 1, a ghost image prevention element 6 may also be tightly bound to planar surface 4 of the beamsplitter 2. Ghost image prevention element 6 may also be made of a material that is optically equivalent to the material of the ghost image prevention element 5 and the beamsplitter 2. By using a ghost image prevention element 6 of the same shape and/or material as ghost image prevention element 5, production costs may be reduced.

Although the surfaces 3 and 4 of the beamsplitter 2 might be initially formed with desired curvatures so as to avoid making and connecting separate ghost image prevention elements 5 and 6, while also avoiding problems of internal reflections at the interface of the ghost image prevention elements and planar surfaces 3 and 4, as shown in FIG. 1, it is difficult to properly form such structures with aligned curved surfaces. Thus, the production costs would be high. Therefore, the tightly bound arrangement of FIG. 1, that defines an integral unit but not a one-piece unit, is preferred. However, the term "tightly bound" as used herein includes the ghost image prevention elements being formed as a one-piece structure with the beamsplitter 2 so that no clear boundary exists between the planar elements and the ghost image prevention elements. Additionally, although the curved surfaces of the ghost image prevention elements 5 and 6 are shown as convex surfaces, one or both may instead be concave, as discussed later with regard to Embodiment 2.

The curved surface of the ghost image prevention element 5 or 6 is a lens surface with a large radius of curvature which satisfies the above Condition (1). The curved surface of each of the ghost image prevention elements has a relatively large radius of curvature, as indicated by the above Condition (1). If the ratio of Condition (1) is greater than the upper limit, light reflected from the curved surface of the ghost image prevention element may allow ghost images to form because the reflected light may not be adequately diffused. If the ratio of Condition (1) is less than the lower limit, the optical performance of the ghost image prevention element must be fully integrated into the design of the entire imaging optical system. In that regard, it is noted that no deviation of the parallel light rays caused by the curved surface of the ghost image prevention elements is apparent in FIG. 1. This is because the radii of curvature of those curved surfaces are so large that parallel light passing through those surfaces is only slightly deviated.

The index of refraction of the material of the ghost image prevention elements 5, 6 is generally given by the above Condition (2). The index of refraction of the ghost image prevention element is substantially the same as the index of refraction of the planar element at a wavelength of interest. When a range of wavelengths is being imaged, the indexes of refraction throughout the range of wavelengths should substantially coincide at each wavelength for the ghost image prevention element and the planar element. The term "optically equivalent" is defined to mean that the indexes of refraction and other refractive characteristics, such as Abbe numbers, as appropriate, are substantially the same. The above Condition (2) limits the refractive index at the sodium d-line of the ghost image prevention elements 5 and 6 to prevent the occurrence of ghost images due to reflection at the junction surfaces of the ghost image prevention elements 5 and 6 and the planar surfaces 3 and 4 of the beamsplitter 2.

When the ghost image prevention elements 5 and 6 are tightly bound to the planar surfaces 3 and 4 of the beamsplitter 2 using an adhesive, generally an adhesive agent with an index of refraction also in the range of Condition (2) should be used. If an adhesive agent with an index of refraction outside of that range is used, the differences between the refractive indexes of the adhesive agent and the beamsplitter 2 and the ghost image prevention elements 5 and 6 may create unwanted reflected light, resulting in noticeable ghost images.

Specific embodiments of the invention will now be discussed in detail.

Embodiment 1

FIG. 1 shows the imaging optical system according to a first embodiment of the invention. As this figure was described above in discussing the invention in general terms, further discussion here will be omitted. In this embodiment ghost image prevention elements 5 and 6 are each a planoconvex lens having the same shape, so that production costs will be minimized. However, where both ghost image prevention elements are of the same shape, care must be taken to insure that the combined effect of the two ghost image prevention elements will not adversely affect the parallel nature of the collimated light of the light flux in the parallel light flux area C.

Embodiment 2

The imaging optical system of FIG. 3 is similar to that of FIG. 1 (Embodiment 1), and therefore, generally only the differences between FIG. 1 and FIG. 3 will be discussed. In FIG. 3, ghost image prevention element 15 with planar and concave surfaces and ghost prevention element 16 with planar and convex surfaces are illustrated. An example of the light traveling directions of the primary light beam as it is reflected from the image surface 1 and is then reflected by the concave surface of the ghost image prevention element 15 is shown by the direction arrows $1_{11}$–$1_{15}$. These direction arrows are similar to the illustrated light traveling directions $1_1$–$1_5$ of the primary light beam in FIG. 1.

The radii of curvature of the curved lens surfaces of the ghost image prevention elements 15 and 16 that are tightly bound with the planar surfaces 3 and 4, respectively, of the beamsplitter 2 are fixed so that the refractive power of the integral unit formed by the ghost image prevention elements 15 and 16 and the beamsplitter 2 is substantially zero. By this construction, the integral unit may replace a conventional beamsplitter cube, as shown in FIG. 5, without requiring changes in the optical properties or positions of the other optical elements of the imaging optical system in order to maintain high optical performance and to eliminate problems of ghost images. FIG. 3 shows the convex lens element 16 that is tightly bound to planar surface 4 and the concave lens element 15 tightly bound to planar surface 3; alternatively, a convex lens may be tightly bound to planar surface 3 and a concave lens may be tightly bound to planar surface 4 so as to similarly provide an integral unit with substantially zero refractive power.

Embodiment 3

The imaging optical system of FIG. 4 is similar to that of FIG. 1 (Embodiment 1), and therefore, only the differences between FIG. 4 and FIG. 1 will be discussed. Unlike FIG. 1, FIG. 4 includes an additional ghost image prevention element 9 that is tightly bound to the bottom planar surface 8 of beamsplitter 2 and a lens $L_4$ that focuses collimated input light that is parallel to the optical axis X to the point P' on an image surface 7. The planar surface 8 is generally orthogonal to the optical axis as well as to exit surface 3. For the ghost image prevention element 9, the same optical material, such as the same glass material, as the beamsplitter 2 and the ghost image prevention elements 5 and 6 is used. Also, the convex surface on the side of the ghost image prevention element 9 that is opposite the junction surface having a planar bottom surface 8 of beamsplitter 2 has a relatively large radius of curvature.

Each ghost image prevention element 5, 6 and 9 is tightly bound to the planar surface of beamsplitter 2 to which it is adjacent. When light that has been reflected from the image surface 7 is again reflected from the curved surface of either or both of the ghost image prevention elements 6 or 9 back to the image surface 7, it will travel a different route from the light originally reflected from the image surface 7 to the ghost image prevention elements 6 or 9. This is illustrated in FIG. 4 by the direction arrows $1_9$ and $1_{10}$ where the light is again reflected from the ghost image prevention element 9. Therefore, the occurrence of ghost images can be prevented even when a bright object is being imaged because the light is diffused over a considerably broader range than the image of the object on the image surface 7.

In FIG. 4, an example of the traveling direction of the primary light beam of light reflected from the image surface 7 is shown by the direction arrows $1_6$–$1_{10}$, and these are similar to the traveling direction arrows $1_1$–$1_5$ of the primary light beam of the first image surface side.

In the example of the present invention, lenses having the same shape may be used for the ghost image prevention elements 5, 6, and 9. The manufacturing cost of the elements is reduced by using lenses having the same shape.

The invention being thus described, it will be obvious that the same may be varied in many ways. For example, the shape and the number of lenses constituting the imaging optical system may be varied. The planar element is not limited to a beamsplitter, but may be any optical element that is positioned in a parallel light flux area of an imaging optical system and having at least one planar surface generally orthogonal to an optical axis to which a separate ghost image prevention element is tightly bound to form an integral unit or a one-piece element that defines a similar tightly bound arrangement, as previously defined herein. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An imaging optical system comprising:

an optical element that is positioned in a light flux area where a central light flux is generally parallel to the optical axis;

at least one ghost image prevention element that is made of a material that is optically equivalent to that of the optical element and is tightly bound with the optical element along a first plane that is generally orthogonal to the optical axis so that the ghost image prevention element lies on one side of the first plane and the optical element lies on the other side of the first plane, wherein a surface of the ghost image prevention element opposite the first plane is a curved surface; and a lens structure for focusing light transmitted by the optical element and the ghost image prevention element to an image surface;

wherein the imaging optical system satisfies the following condition $$7<|R|/f_{mr}<20$$

where

R is the radius of curvature of the curved surface of the ghost image prevention element that is opposite the first plane, and $f_{mr}$ is the focal length of the lens structure.

2. The imaging optical system of claim 1, wherein said at least one ghost image prevention element is formed separately from the optical element.

3. The imaging optical system of claim 2, wherein said at least one ghost image prevention element is tightly bound to the optical element by adhesive bonding.

4. The imaging optical system of claim 2, wherein said at least one ghost image prevention element includes a planar surface at the first plane.

5. The imaging optical system of claim 1, wherein said at least one ghost image prevention element is made of a material that has an index of refraction that satisfies the following condition:

$$1.5<n_d<1.6$$

where $n_d$ is the index of refraction of the material of the ghost image prevention element at the wavelength of the sodium d-line.

6. The imaging optical system of claim 1, wherein the at least one ghost image prevention element is made of glass.

7. The imaging optical system of claim 1, wherein the optical element is a beamsplitter.

8. The imaging optical system of claim 1, and further comprising: a second ghost image prevention element that is optically equivalent to the optical element and is tightly bound with the optical element along a second plane that is generally orthogonal to said optical axis of the imaging optical system so that the ghost image prevention element lies on one side of the second plane and the optical element lies on the other side of the second plane, and wherein a surface of the ghost image prevention element opposite the second plane is a curved surface having a radius of curvature selected so that the refractive power of the combination of the optical element and the first and second ghost image prevention elements is substantially zero.

9. The imaging optical system of claim 8, wherein both ghost image prevention elements are formed separately from the optical element.

10. The imaging optical system of claim 9, wherein both ghost image prevention elements are tightly bound to the optical element by adhesive bonding.

11. The imaging optical system of claim 9, wherein each of the first and second ghost image prevention elements includes a planar surface in the first and second planes, respectively.

12. The imaging optical system of claim 7, and further comprising: a second ghost image prevention element that is optically equivalent to the optical element and tightly bound with the optical element along a second plane that is generally orthogonal to the optical axis so that the second ghost image prevention element lies on one side of the second plane and the optical element lies on the other side of the second plane, and wherein a surface of the second ghost image prevention element opposite the second plane is a curved surface having a radius of curvature selected so that the refractive power of the combination of the optical element and the first and second ghost image prevention elements is substantially zero.

13. The imaging optical system of claim 12, wherein both ghost image prevention elements are formed separately from the optical element.

14. The imaging optical system of claim 13, wherein both ghost image prevention elements are tightly bound to the optical element by adhesive bonding.

15. The imaging optical system of claim 13, wherein each of the first and second ghost image prevention elements includes a planar surface at the first and second planes, respectively.

16. The imaging optical system of claim 7, and further comprising: a second ghost image prevention element that is optically equivalent to the optical element and tightly bound with the optical element along a second plane that is generally orthogonal to the optical axis so that the second ghost image prevention element lies on one side of the second plane and the optical element lies on the other side of the second plane, and wherein a surface of the second ghost image prevention element that is opposite the second plane is a curved surface having a radius of curvature.

17. The imaging optical system of claim 16, and further comprising: a third ghost image prevention element that is optically equivalent to the optical element and tightly bound with the optical element along a third plane that is generally orthogonal to the first and second planes so that the third ghost image prevention element lies on one side of said third plane and the optical element lies on the other side of said third plane, and wherein a surface of the ghost image prevention element that is opposite said third plane is a curved surface having a radius of curvature.

18. The imaging optical system of claim 16, wherein the curved surfaces of the first and second ghost image prevention elements are convex surfaces.

19. The imaging optical system of claim 17, wherein the curved surfaces of the first, second and third ghost image prevention elements are convex surfaces.

20. The imaging optical system of claim 1, and further comprising: a second ghost image prevention element that is optically equivalent to the optical element and is tightly bound with the optical element along a second plane that is generally orthogonal to the optical axis so that the second ghost image prevention element lies on one side of the second plane and the optical element lies on the other side of the second plane, and wherein a surface of the second ghost image prevention element that is opposite the first plane is a curved surface having a radius of curvature.

* * * * *

UNITED STATES PATENT AND TRADEMARK OFFICE
CERTIFICATE OF CORRECTION

PATENT NO. : 6,783,246 B2
DATED : August 31, 2004
INVENTOR(S) : Yahagi

It is certified that error appears in the above-identified patent and that said Letters Patent is hereby corrected as shown below:

Column 1,
Line 8, change "an a" to -- an --; and
Line 9, change "focal" to -- afocal --.

Signed and Sealed this

Fifth Day of April, 2005

JON W. DUDAS
*Director of the United States Patent and Trademark Office*